US007656096B2

(12) United States Patent
Ribarich

(10) Patent No.: US 7,656,096 B2
(45) Date of Patent: Feb. 2, 2010

(54) HYBRID BALLAST CONTROL CIRCUIT IN A SIMPLIFIED PACKAGE

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 643 days.

(21) Appl. No.: 10/835,637

(22) Filed: Apr. 30, 2004

(65) Prior Publication Data

US 2004/0227471 A1 Nov. 18, 2004

Related U.S. Application Data

(60) Provisional application No. 60/466,919, filed on Apr. 30, 2003.

(51) Int. Cl.
*H05B 37/02* (2006.01)
(52) U.S. Cl. .................................. 315/224; 315/225
(58) Field of Classification Search ............. 363/21.06, 363/21.14, 125–127; 330/10, 207 A, 251; 315/224, 225, 209 R, 307, 291; 336/83; 318/139
See application file for complete search history.

(56) References Cited

U.S. PATENT DOCUMENTS

| 5,331,258 | A  | * | 7/1994  | Lankin et al. ............... 318/139 |
| 5,353,001 | A  | * | 10/1994 | Meinel et al. ................. 336/83 |
| 6,020,691 | A  | * | 2/2000  | Sun et al. ..................... 315/307 |
| 6,107,851 | A  |   | 8/2000  | Balakirshnan et al. ...... 327/172 |
| 6,226,190 | B1 |   | 5/2001  | Balakrishnan et al. ... 363/21.13 |
| 6,297,623 | B1 |   | 10/2001 | Balakrishnan et al. ...... 323/283 |
| 6,414,471 | B1 |   | 7/2002  | Balakrishnan et al. ...... 323/283 |
| 6,456,475 | B1 |   | 9/2002  | Balakrishnan et al. ........ 361/94 |
| 6,597,587 | B1 | * | 7/2003  | Poon et al. ................ 363/21.06 |
| 6,608,471 | B2 |   | 8/2003  | Balakrishnan et al. ....... 323/283 |
| 6,657,400 | B2 | * | 12/2003 | Konopka et al. ............. 315/224 |
| 6,747,443 | B2 |   | 6/2004  | Balakrishnan et al. ....... 323/284 |
| 6,762,645 | B1 | * | 7/2004  | Grant ........................ 330/251 |

FOREIGN PATENT DOCUMENTS

| EP | 1 067 827 | 2/2001 |
| JP | 7-74315 | 1/1995 |
| JP | 2001-43988 | 2/2001 |
| WO | WO 2004/028206 | 4/2004 |

OTHER PUBLICATIONS

McGraw-Hill Dictionary of scientific and technical terms 6th edition, 2002, p. 193.*

(Continued)

*Primary Examiner*—Wilson Lee
(74) *Attorney, Agent, or Firm*—Farjami & Farjami LLP

(57) ABSTRACT

A hybrid electronic ballast circuit includes a ballast control, half-bridge driver, and a power switch half-bridge in a single package. The ballast circuit includes a number of fault protections and safety features and is self-oscillating to drive a resonant circuit including a fluorescent lamp. Internal feedback and control signals are provided for a number of modes of operation, including startup, preheat, normal run mode and fault protection response mode. A voltage controlled oscillator adjusts the switching frequency of the switching half-bridge to maintain zero volt switching and minimum current switching. The entire ballast control may have only three external connections, and may be implemented in a TO220 package.

16 Claims, 8 Drawing Sheets

OTHER PUBLICATIONS

B. W. Williams, Power Electronics 2nd edition, 1992, McGraw-Hill Inc. pp. 375-376.*

S. Rama Reddy, Fundamentals of Power Electronics, 2000, Alpha Science International Ltd. p. 160.*

Office Action issued by Japanese Patent Office on Oct. 3, 2006 in connection with corresponding Japanese patent application No. 2004-274054 and English translation of the Japanese Office Action.

* cited by examiner

HYBRID BALLAST CONTROL CIRCUIT IN A SIMPLIFIED PACKAGE

RELATED APPLICATION

The present application is based on and claims benefit of U.S. Provisional Application No. 60/466,919, filed Apr. 30, 2003, entitled 3-PIN TO220 BALLAST CONTROL HYBRID, to which a claim of priority is hereby made.

BACKGROUND OF THE INVENTION

1. Field of the Invention

The present invention relates generally to electronic ballasts for fluorescent lamps and relates more particularly to a simplified hybrid ballast control and package.

2. Description of Related Art

Electronic ballasts are used in a number of fluorescent lighting applications, particularly those that operate with a switching half-bridge. Such an electronic ballast is illustrated in U.S. Pat. No. 6,008,593 to International Rectifier Corporation. Electronic ballast controls have evolved to include a wide range of functionality and features including power factor correction and fault detection in response circuitry. A typical electronic ballast includes several control ICs that operate switches in the electronic ballast and receive feedback signals to control the fluorescent lamp driven by the switching half-bridge. A control IC for controlling the switching half-bridge typically includes an oscillator that is used to drive the switching signals for the half-bridge switches coupled to the fluorescent lamp load. One type of implementation of an electronic ballast using an oscillator involves connecting a voltage controlled oscillator (VCO) into the electronic ballast and driving the VCO with an appropriate signal to modify the switching frequency as desired. For example, in the case of fluorescent lamp applications, the switching frequency of the electronic ballast can be adjusted to vary during startup or under fault conditions to improve operation of the electronic ballast.

The electronic ballast also typically fulfills various control design features such as preheating lamp filaments, igniting the lamp, driving the lamp to a desired power level, detecting lamp fault conditions and safely deactivating the electronic ballast. The use of electronic ballasts for gas discharge lamps such as fluorescent lamps are widely available due to the use of power MOSFET switching devices and insulated gate bipolar transistors (IGBT) that replace previously used power bipolar switching devices. Monolithic gate driver circuits, such as the IR2155 sold by International Rectifier Corporation and described in U.S. Pat. No. 5,545,955 have been used for driving power MOSFETs or IGBTs in electronic ballasts. The IR2155 gate driver IC is advantageous in a number of applications because it is packaged in a conventional DIP or SOIC package with a small profile and is usable in standard manufacturing processes.

In each of the above described electronic ballast circuits, the control ICs is realized separately from the power switches in the switching half-bridge or in other sections of the electronic ballast. In addition, the control ICs use external components, such as passive components, to obtain features such as programmable preheat time, minimum frequency and so forth. The external components can be determined based on application specific criteria by a designer to improve flexibility of the control IC. In many applications, however, it is desirable to obtain a simplified, application specific ballast control with low cost and easy manufacturability to implement a lighting control system.

SUMMARY OF THE INVENTION

In accordance with the present invention, there is provided an electronic ballast that is substantially simplified and packaged as a single unit to meet the needs of the lighting system industry. The single unit package includes a ballast control IC, passive components for programming features in the ballast control IC and a switching half-bridge circuit to provide a controlled power output to a lamp load. The entire electronic ballast can be incorporated into a single TO220 package, for example, with only three connection pins to provide complete electronic ballast operability. The electronic ballast control package may combine a switching half-bridge composed of MOSFET switches with a ballast control circuit, a charge pump supply and passive components that determine the control parameters for the electronic ballast.

Among the features provided by the hybrid ballast control are preheat time set by an integrated capacitor coupled to the VCO of the ballast control. The hybrid ballast control also includes integrated fault protection, including undervoltage lockout, non-ignition conditions, excessive current conditions and open filament faults. The hybrid ballast control detects excessive currents that can occur during ignition if the lamp does not ignite. Because a fluorescent lamp typically operates with a resonant inductor, the inductor may saturate, resulting in a non-ignition lamp failure, which is detected by the electronic ballast of the present invention. The ballast control can perform a crest factor measurement based on the RDSON value of the low side switch in the switching half-bridge. If excessive currents are detected through the crest factor measurement, the ballast control enters a fault mode in which the switching half-bridge driver outputs are disabled to prevent damage to the lighting system and system components. The crest factor measurement is a relative current measurement that is independent of temperature and tolerance variations in the low side MOSFET of the switching half-bridge. Accordingly, a more accurate current sense can be obtained than when the RDSON voltage of a low side switch is used alone. A lockout reset feature is provided to permit the electronic ballast to shutdown after the detection of a fault, so that power to the electronic ballast must be cycled before the electronic ballast can begin operating again.

A fixed minimum frequency feature is also provided in the electronic ballast control according to the present invention. This feature can prevent hard switching in the switching half-bridge to avoid switching losses and potential damage to the half-bridge switching components.

Other features and advantages of the present invention will become apparent from the following description of the invention which refers to the accompanying drawings.

DETAILED DESCRIPTION OF THE PREFERRED EMBODIMENTS

Figure 1:
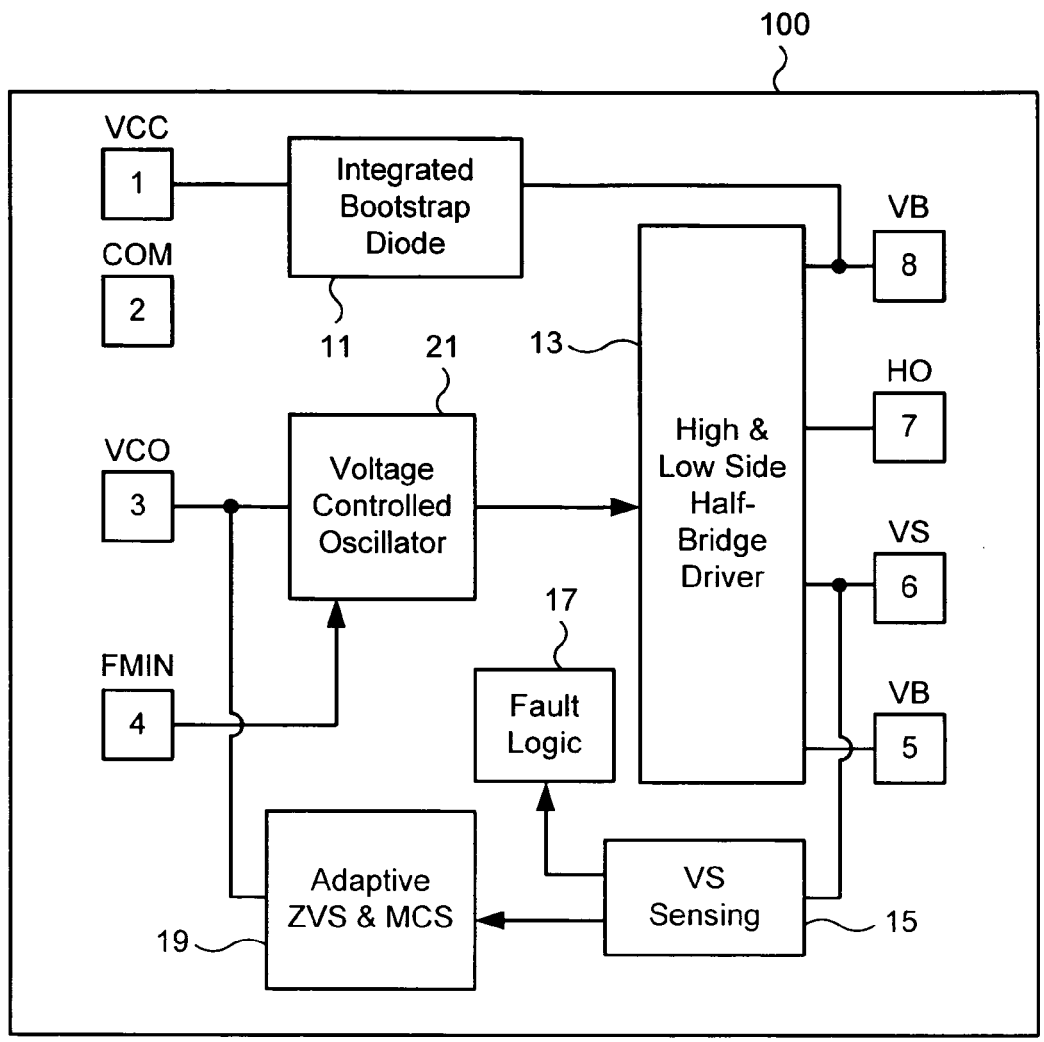
FIG. 1 is a block diagram of an electronic ballast control according to the present invention.
Figure 2:
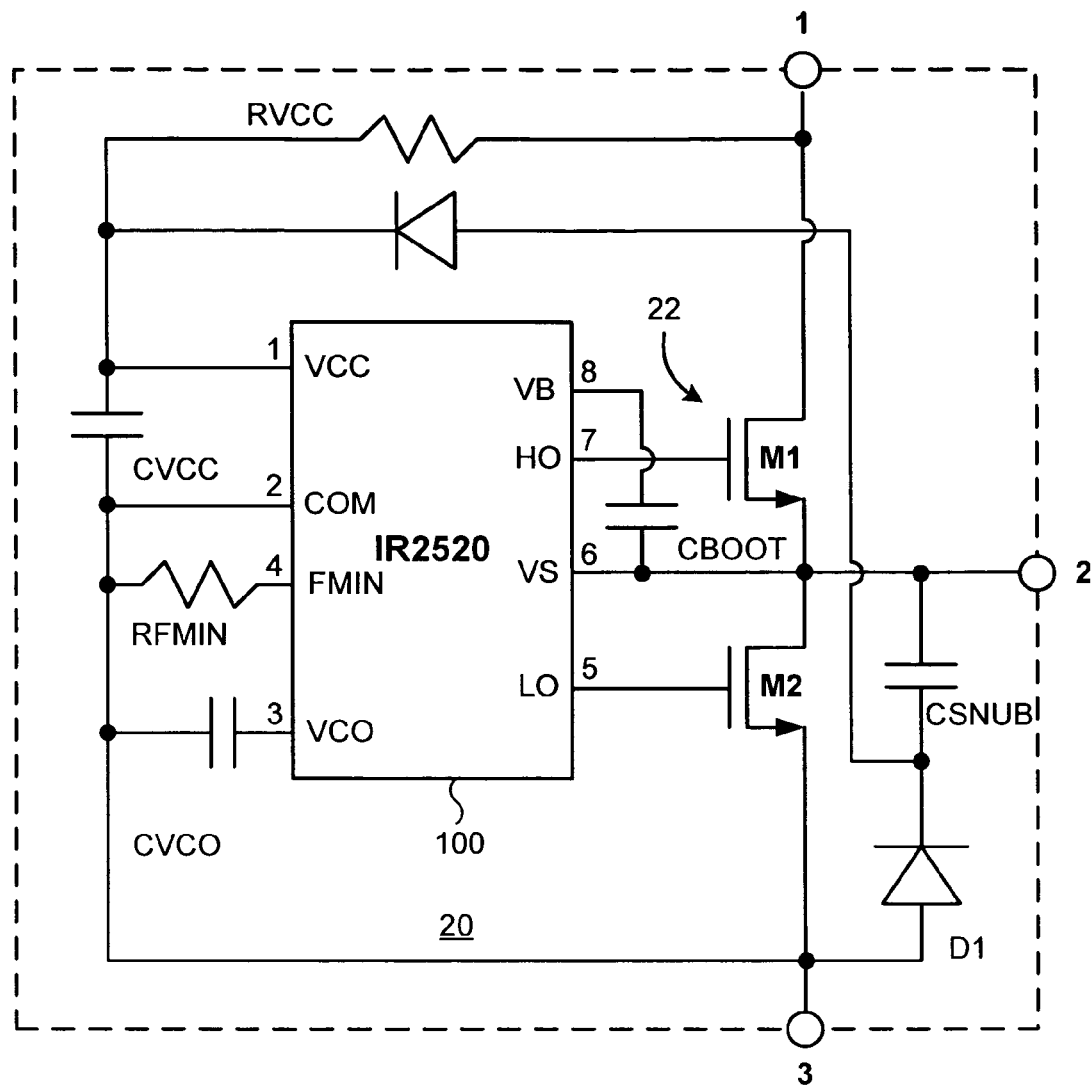
FIG. 2 is a schematic circuit diagram of the hybrid electronic ballast according to the present invention.

Referring now to FIGS. 1 and 2, a block diagram of an integrated control circuit 100 used in a hybrid ballast control 20 according to the present invention is illustrated. Control circuit 100 includes numbered indications of connections for inputs and outputs for the ballast control. VCC voltages connected to connection number 1, while a VCO signal is connected to connection number 3 and a minimum frequency component is connected to FMIN on connection number 4. Outputs HO and LO are connections 7 and 5, respectively, provide the driver outputs for half-bridge switches M1, M2. Voltage VB on connection number 8 provides the power connection for half-bridge driver 13, while voltage VS on connection number 6 provides the reference voltage for the high side switch M1 in half-bridge 22. Connection number 2, labeled COM represents the common voltage connection to provide a return path and voltage reference in control circuit 100.

Control circuit 100 also includes an integrated bootstrap diode between voltages VCC and VB that contributes to providing a startup voltage for the high side driver circuitry in conjunction with supply capacitors CBOOT (FIG. 2). Circuit 100 also includes a voltage control oscillator (VCO) 21 that performs a number of functions in the electronic ballast control. Signal VCO on connection 3 is connected to a capacitor CVCO (FIG. 2) that determines the frequency of VCO 21. By controlling the way capacitor CVCO is charged, VCO 21 can change the switching frequency of half-bridge 22 during various operational profiles including startup mode, run mode and fault mode. The frequency of VCO 21 is influenced by an adaptive feedback control loop with a current sensing feedback obtained in a VS sensing block 15. In addition, an adaptive zero voltage and minimum current switching control 19 provides a frequency adjustment to influence half-bridge switching through VCO 21 and half-bridge driver 13. Switching control 19 influences the frequency of VCO 21 based on VS sensing block 15 to obtain zero volt switching (ZVS) and minimum current switching (MCS) in half-bridge 22. VCO 21 is programmably limited to a minimum frequency by settings applied to signal FMIN on connection 4, as described in greater detail below.

As shown in FIG. 2, ballast control 20 according to the present invention is illustrated as ballast control 20. Ballast control 20 incorporates control circuit 100 described in FIG. 1 to receive control inputs and drive switching half-bridge 22 composed of switches M1 and M2. High side switch M1 in switching half-bridge 22 is connected to the DC bus indicated as external package connection 1. Accordingly, switch M1 switches DC power to hybrid ballast control output pin 2. Low side switch M2 in half-bridge 22 is connected to hybrid ballast control output 2 and common reference point 3 to provide all the external power connections to hybrid ballast control 20. Accordingly, all high power signals switched by hybrid ballast control 20 flow through switches M1 and M2 in half-bridge 22. Hybrid ballast control 20 therefore uses three external connections to provide the electronic ballast control functionality for driving a gas discharge lamp in a resonant circuit. Because the passive components in hybrid ballast control 20 and switches M1, M2 and diodes D1, D2 can be integrated on a small substrate, for example, hybrid ballast control 20 can be implemented in a small package such as a TO220 with three pin connections.

Figure 3:
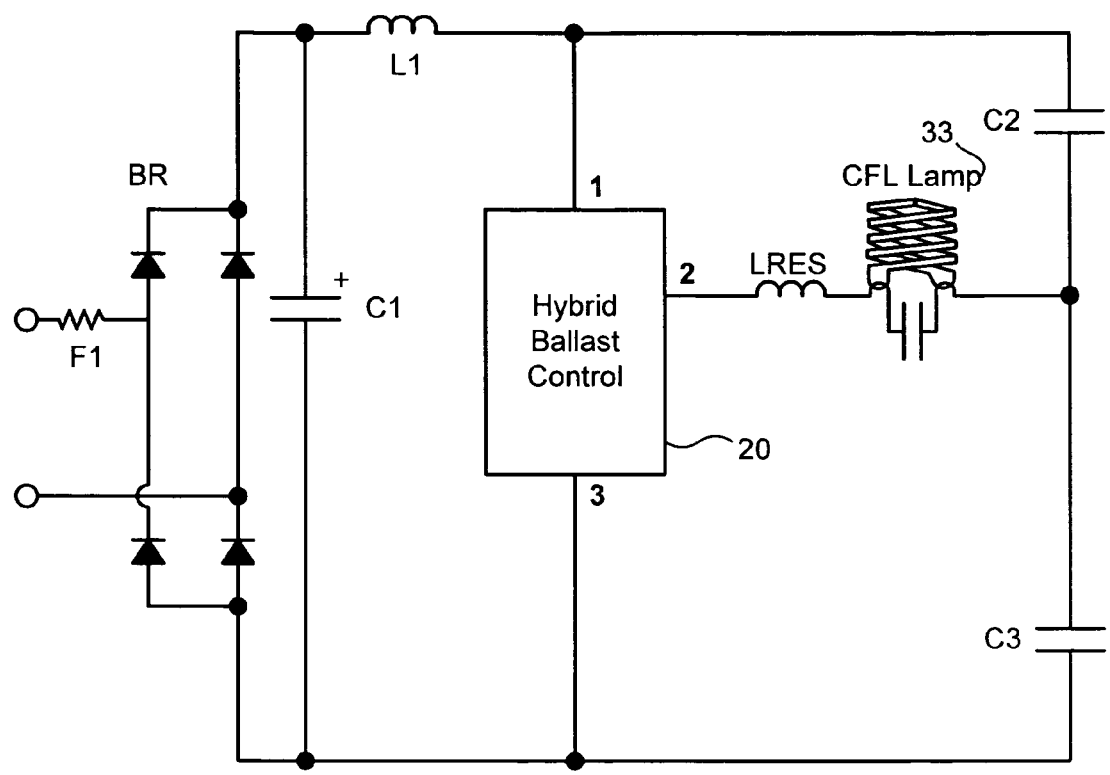
FIG. 3 is a circuit diagram of a lighting application incorporating the electronic ballast according to the present invention.

Referring now to FIG. 3, a circuit diagram of a CFL lamp 33 with electronic ballast control 20 is illustrated. Ballast control 20 provides an output to inductor LRES, which forms a resonant circuit together with CFL lamp 33. DC power is supplied to ballast control 20 through connection 1 from inductor L1, capacitor C1 and full-bridge rectifier BR. Output connection 2 of ballast control 20 supplies high frequency power to lamp 33 through a resonant circuit composed of inductor LRES and capacitor CRES. The combination of inductor LRES and capacitor CRES created a resonant circuit with a resonant frequency that drives lamp 33 with high efficiency. Ballast control 20 includes an adaptive control 19 (FIG. 1) that seeks to drive the output of ballast control 20 at a frequency that approaches the resonant frequency of the resonant circuit composed of inductor LRES and capacitor CRES. As the switching frequency approaches the resonant frequency, minimum current switching can take place because the output current on output 2 of ballast control 20 is almost in phase with the output voltage on output 2. With this type of in-phase, near resonance operation, switching losses in the half-bridge in ballast control 20 are minimized.

Figure 4:
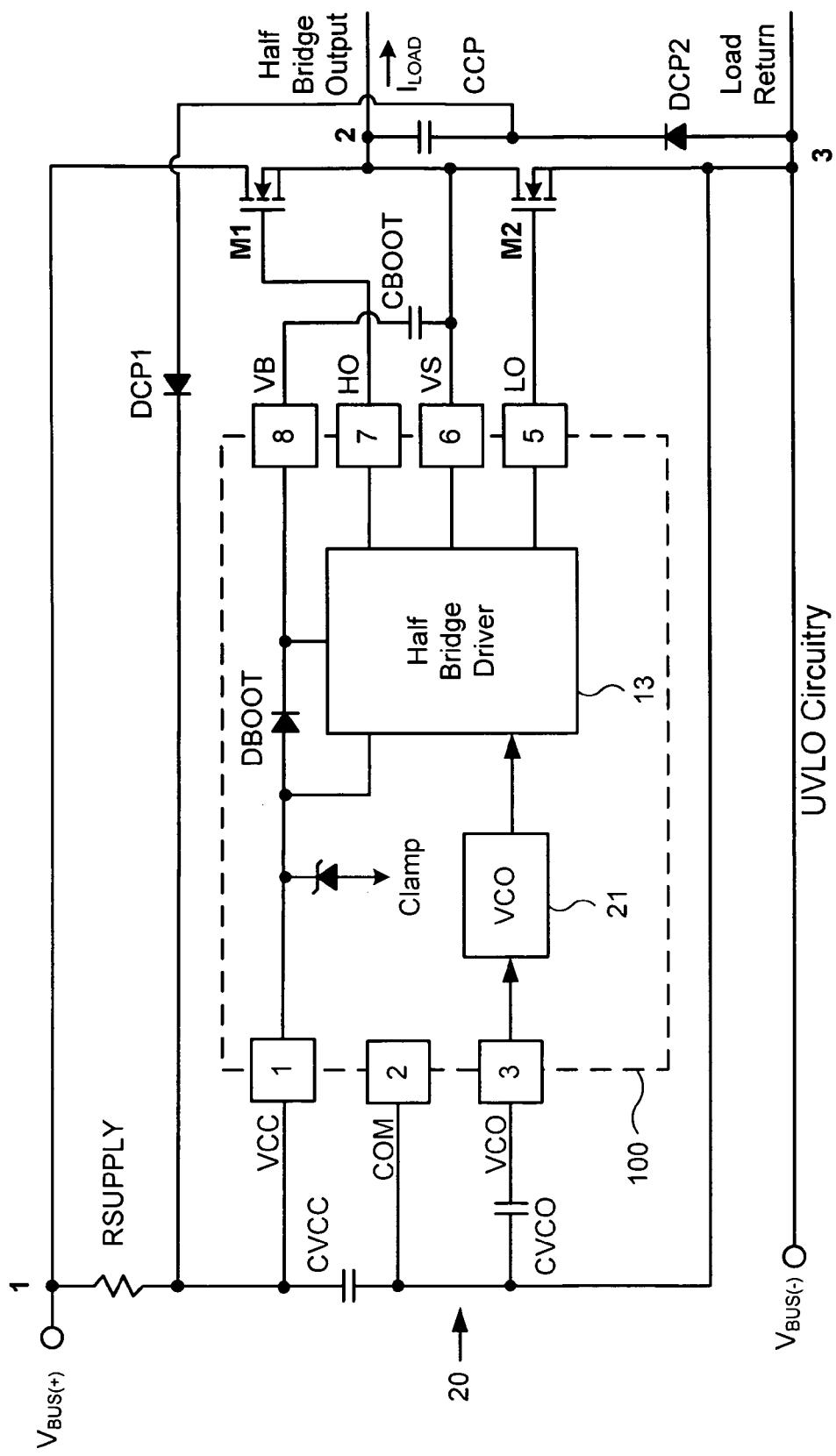
FIG. 4 is a schematic block diagram of the hybrid electronic ballast illustrating undervoltage protection according to the present invention.

Referring now to FIG. 4, hybrid ballast control 20 is illustrated with particular components pertinent to operation in undervoltage lockout mode. Undervoltage lockout mode (UVLO) is entered when supply voltage VCC falls below the turn on threshold of integrated control circuit 100. UVLO mode maintains an ultra low supply current, i.e., <200 μa, which permits control circuit 100 to be fully functional before the half bridge drivers, both high and low sides, are activated. A start up capacitor CVCC charges with current supplied by VBUS through resistor RSUPPLY, minus the start up current drawn by control circuit 100. Resistor RSUPPLY is chosen to provide sufficient current to supply control circuit 100 from the bus voltage VBUS. Capacitor CVCC is large enough to maintain a voltage for VCC above a threshold for UVLO mode for at least one half cycle of the input line voltage. Capacitor CVCC maintains the DC voltage on VCC and charges during peak input voltage supplied by VBUS. When the voltage on capacitor CVCC supplied to VCC reaches a start up threshold, control circuit 100 turns on and begins to drive outputs HO and LO to begin switching half bridge switches M1 and M2 in oscillation.

High side driver circuitry voltage provided on connection VB is initially assisted by internal bootstrap diode DBOOT and supply capacitor CBOOT to quickly obtain operating voltages at startup. A charge pump circuit composed of capacitor CCP and diodes DCP1 and DCP2 supply low side driver voltage for the drive circuitry on connection VS. During circuit turn-on, it is desirable to have the high side voltage supply be charged to an appropriate value prior to turning on high side switch M1. Accordingly, to provide enough time to charge the high side supply circuitry before a first pulse is delivered on signal HO, signal LO provides the first oscillation pulse when switching in the switching half-bridge is initiated.

During UVLO mode, control circuit 100 is placed in a safety mode and high and low side driver outputs HO and LO, respectively, are both turned off, or tied low. In addition, line VCO is pulled down to the common voltage on line COM to reset the starting frequency of VCO 21 to a maximum value.

Figure 5:
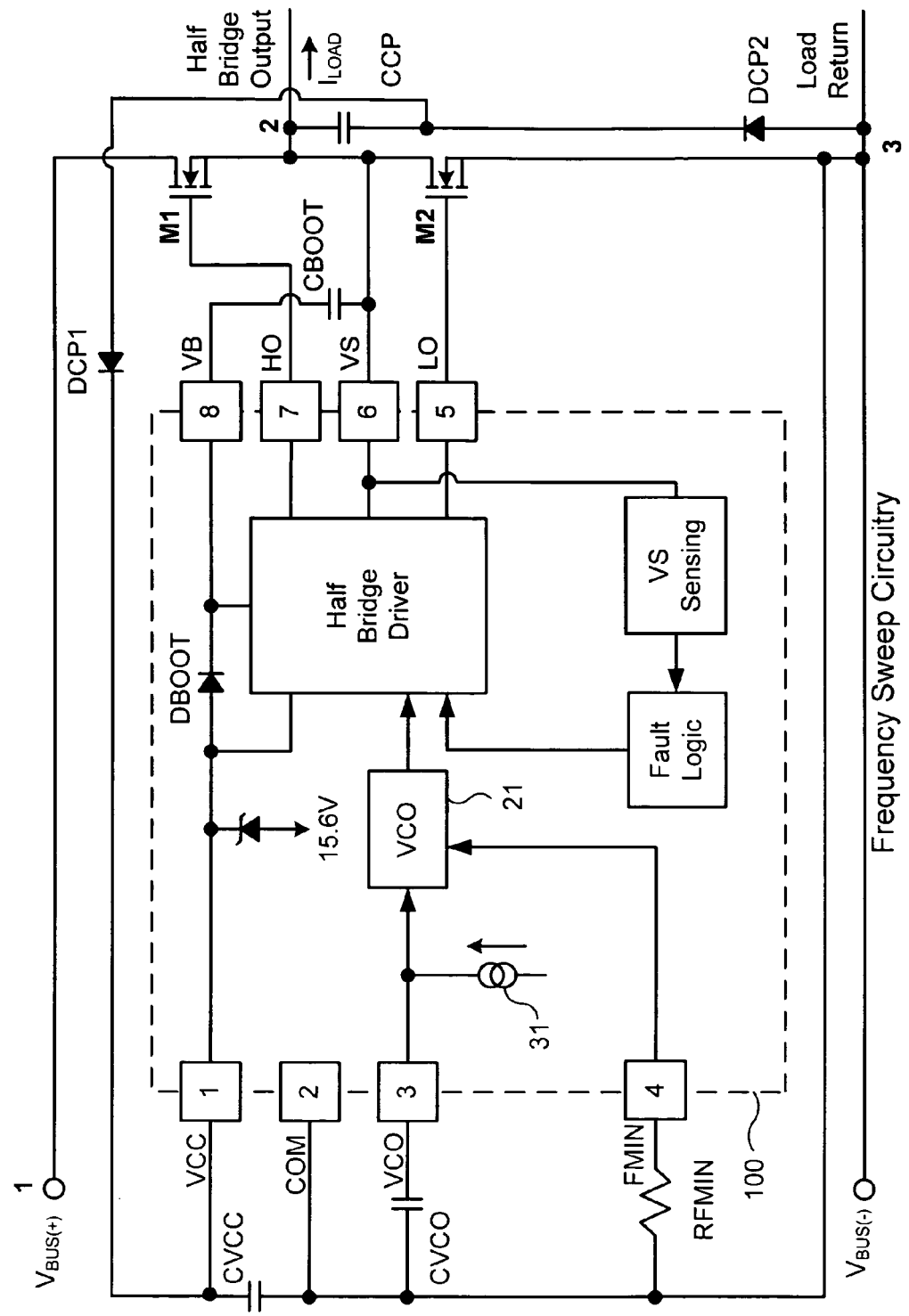
FIG. 5 is a schematic block diagram of the hybrid electronic ballast illustrating frequency operation according to the present invention.

Referring now to FIG. 5, a circuit block diagram of the electronic ballast according to the present invention is illustrated with components particular to operation of the frequency sweep circuitry. Frequency sweep mode is typically engaged when the electronic ballast is powered up and begins to operate. When VCC exceeds a UVLO positive threshold, control circuit 100 enters frequency sweep mode. An internal current source 31 charges capacitor CVCO connected on line VCO of control circuit 100. As capacitor CVCO charges, the voltage supplied to VCO 21 begins to ramp up exponentially. As the voltage on line VCO increases, the frequency of VCO 21 decreases correspondingly, ramping down towards a resonance frequency of the resonant circuit consisting of inductor LRES and capacitor CRES, for example. The voltage on line VCO is initially zero, which sets the output frequency of VCO 21 to the maximum frequency of the circuit. During preheat and ignition, in a frequency sweep mode, the voltage on line VCO ramps up with an exponential waveform shape defined by equation (1) below.

$$v(t) = V(1 - e^{-t/RC}) \quad (1)$$

The voltage on line VCO approaches 5 volts as it ramps up, which equates to a minimum frequency, as programmed by resistor RFMIN supplied on signal FMIN connected to VCO 21. The voltage on line VCO ramps exponentially due to the charge placed on capacitor CVCO through an internal non-linear current source 31. Alternately, the voltage on line VCO may ramp up linearly as programmed by capacitor CVCO.

As the frequency of VCO 21 approaches the resonance frequency of the electronic ballast output stage, and half-bridge switches M1 and M2 oscillate with a frequency approaching the resonance frequency, the output voltage and load current supplied at connection node 2 tend to increase. The switching frequency continues to decrease until the output current and voltage reach a level at which lamp 33 ignites, for example, or until the output current limit is reached. If lamp 33 successfully ignites, the input voltage to VCO 21 continues to increase to reach a value of approximately 4.6 volts. Once the input voltage to VCO 21 reaches 4.6 volts, control circuit 100 switches to adaptive run mode to maintain zero voltage and minimum current switching (ZVMCS).

During frequency sweep mode, the switching frequency can decrease through the resonance frequency. Accordingly, the minimum frequency for VCO 21 is programmed by resistor RFMIN to obtain a lower minimum frequency than that of the resonance frequency expected from the resonance circuit consisting of inductor LRES, capacitor CRES and lamp 33, for example. In the case of a gas discharge lamp 33 as the load controlled by hybrid ballast control 20, the resonant load circuit provides a high-Q resonance so the programmed minimum switching frequency should be lower than the high-Q resonance frequency. If the input voltage to VCO 21 ramps exponentially, VCO 21 ramps quickly through the higher frequencies where the gain across the resonant output stage is low. When there is low gain for the resonant output stage, less current is available for preheating purposes. Accordingly, as VCO 21 outputs a lower frequency, more current is available for preheating to permit better response and increase component life.

The exponential shape of the input voltage to VCO 21 produces a slower ramp through lower frequencies approaching resonance. In the lower frequencies, the gain of the resonant output stage is higher and more stable. Accordingly, preheating can take place under better control with higher currents. The input voltage to VCO 21 may ramp linearly to more simplistically drive the oscillator frequency towards the resonance frequency.

As the frequency approaches resonance, the lamp typically ignites at a frequency above resonance because the gain across the resonant tank increases sharply near the resonant frequency to achieve an output voltage to ignite the lamp. Once the lamp ignites, the load becomes overdamped and the resonant frequency decreases. Because the circuit enters run mode after the lamp ignites, the output of VCO 21 typically remains above resonant frequency.

It is possible that the switching frequency can run below the resonant frequency for a number of cycles, even to the point of reaching FMIN, however, the ZVS circuit brings the frequency back up during run mode. The duration of time below resonant switching frequency is short, and should not cause any problem or damage to the circuit.

As the frequency decreases toward the high-Q resonance frequency during frequency sweep mode, the lamp filaments are preheated until the lamp voltage increases to a high enough point at which lamp 33 ignites. As noted above, the minimum frequency is programmed by resistor RFMIN connected to signal FMIN of control circuit 100. A maximum frequency is set internally to a fixed margin higher than the minimum frequency to ensure that the lamp voltage is low during initial start up to prevent unwanted "flash" from occurring across the lamp. The amount of preheat and time-to-light is programmed by appropriate selection of capacitor CVCO.

Figure 5A:
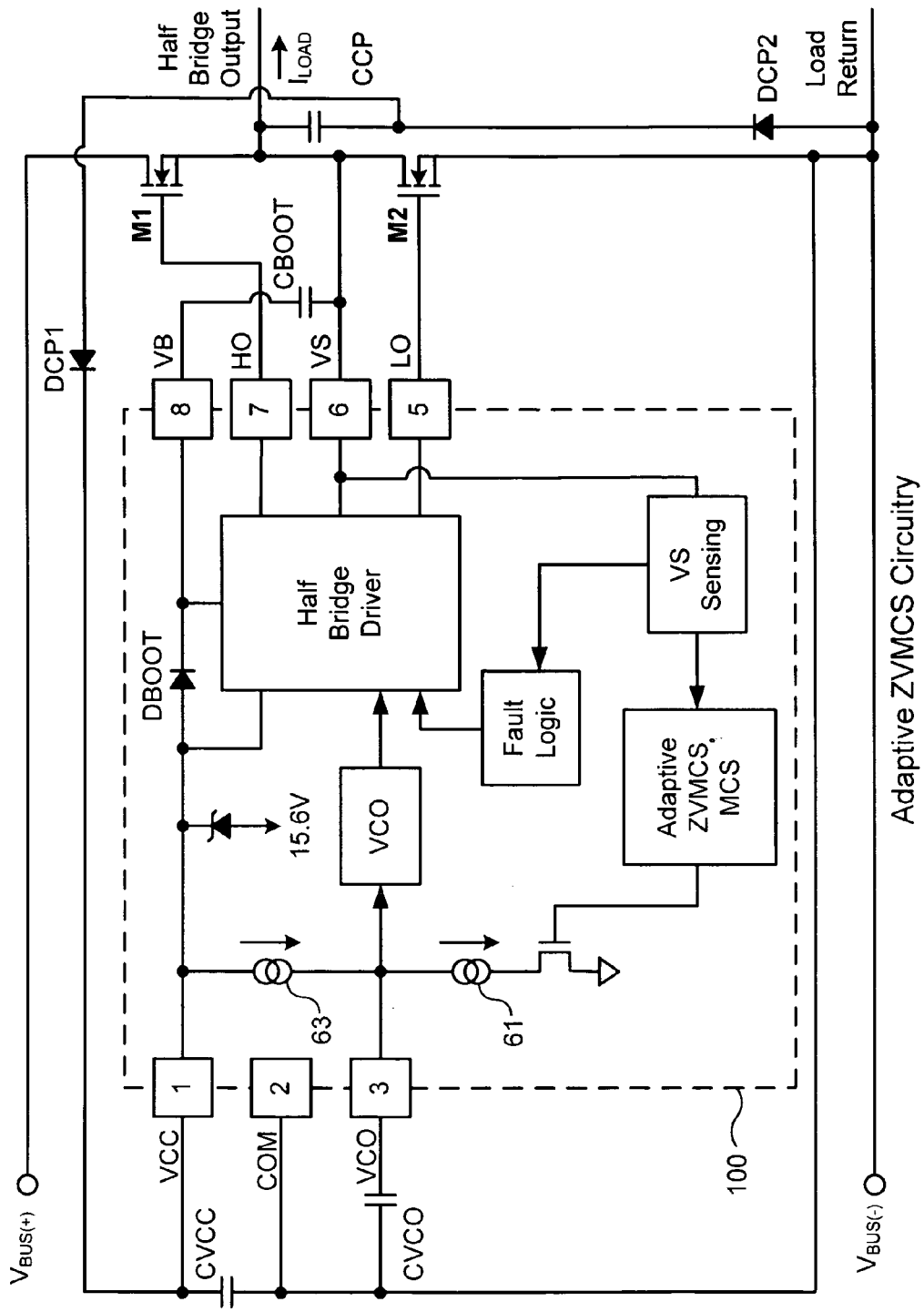
FIG. 5A is a schematic block diagram of the hybrid ballast control according to the present invention illustrating adaptive Zero Volt Minimum Current Switching (ZVMCS) circuitry.

Referring now to FIG. 5A, a circuit diagram showing electronic ballast operation during adaptive run mode is illustrated. Adaptive run mode is enabled when the input voltage to VCO 21 increases above approximately 4.6 volts. At this point, the frequency has typically swept through the resonant frequency and the lamp has ignited. When the lamp ignites, the output stage becomes a low-Q RCL circuit and the switching frequency adjusts through VCO 21 to the desired operating point that is slightly above resonant frequency. According to the adaptive run mode control, the operating frequency is set as close as possible to the resonance frequency of the low-Q RCL output stage, while maintaining ZVS at the half bridge switching stage. With the switching frequency close to the resonance frequency, the output current is nearly in phase with the half bridge output voltage, resulting in MCS. The control thus provides an adaptive run mode with ZVS and MCS that minimizes the switching losses of the half bridge switches M1 and M2.

VS sense 15 obtains feedback from half bridge driver 13 to determine output voltage and phase on line VS. VS sense 15 is provided internally in control circuit 100 to permit good closed loop operating characteristics with high noise immunity. This closed loop control operates half bridge 22 at a frequency close to resonant frequency which permits the electronic ballast to operate with ZVS and MCS even with varying component and lamp tolerances that may occur through manufacturing and production steps. In addition, the closed loop control provides ZVS and MCS as the input line voltage varies, and as component tolerances change over time, for example, as the characteristics of lamp 33 may change over its lifetime.

The closed loop ZVS and MCS control is achieved by sensing the half bridge voltage output on line VS during non-overlapping deadtime for half bridge switching. During each half bridge switching cycle, half bridge voltage slews to the opposite rail during deadtime. Closed loop frequency control parameters are measured in relation to a determination of whether the voltage has slewed entirely to the opposite rail prior to turning on the appropriate switch. That is, if voltage has not slewed to the opposite rail so that there is zero voltage across the switch that is to be turned on, the switching frequency is too close to resonance and the closed loop control shifts the frequency slightly higher. The voltage slew measurement is performed prior to the turn on of the low side switch M2, at the beginning of a small time interval of approximately 100 nanoseconds provided prior to switch turn on to permit early error detection and provide a safe margin for response. If the voltage has not slewed to zero by the time of approximately 100 nanoseconds prior to switch turn on, a pulse of current is delivered to the VCO input 3 from internal current source 61. The current pulse slightly discharges capacitor CVCO, decreasing the voltage input to VCO 21 and causing the output frequency to slightly increase. For the rest of the switching cycle, external capacitor CVCO charges slowly due to current supplied by internal current source 63. The adaptive run mode control thus adjusts the frequency slightly upward as the circuit operating frequency is driven to a lower frequency due to operational events such as changes in line voltage or load characteristics, for example. These operational events tend to produce a decreased resonance frequency that can cause non-ZVS switching. The adaptive closed loop control circuit "nudges" the frequency to a higher value that is slightly above resonance when non zero volt switching occurs. The closed loop adaptive control maintains a switching frequency near resonance in the adaptive run mode to obtain ZVS and MCS operation notwithstanding changing input line voltage and current conditions, component tolerance variations and lamp/load variations.

The fabrication process used in the development of control circuit 100 is a 600 volt fabrication process, and provides an internal high voltage transistor connected to line VS to accurately measure voltage, and particularly zero volts during the non-overlapping deadtime. The internal transistor also withstands high DC bus voltage during portions of the switching cycle when high side switch M1 in the half bridge is turned on, that is, when line VS is at the DC bus potential.

Control circuit 100 also includes fault protection, determined through fault logic 17 (FIG. 1). If a lamp non-ignition condition occurs when the lamp filaments are intact but the lamp does not ignite, the lamp voltage and output stage current increases during the ignition ramp to excessive amounts, as described above. When the output stage current and lamp voltage reach excessive amounts, or if the resonant inductor saturates, a fault is considered to have occurred during ignition. This state is detected by performing an internal measurement on line VS during the entire ON time of low side switch M2. Voltage measured on line VS during the ON time pulse provided on line LO is determined by the low side switch current, which indicates the output stage current. The current is measured flowing through the ON resistance of low side switch M2, that is, a voltage reading is taken across the ON resistance (RDSON) of low side switch M2. By using the internal ON resistance of low side switch M2, the half bridge current is sensed without the need of an additional current sensing resistor, and without the need of an additional current sensing input in control circuit 100. The RDSON value of low side switch M2 serves as the current sensing resistor for fault detection, while line VS serves as the current sensing input for control circuit 100 during start up. During start up, an internal high voltage switch, as described above, is turned on when the voltage on line VS is low, i.e., low side switch M2 is ON, to permit a voltage measure to be obtained through the low side circuitry to perform the current sensing. The internal high voltage switch is turned off for the rest of the switching cycle to withstand the high voltage applied on line VS when high side switch M1 is turned on, and DC bus voltage is applied to line VS.

Because the internal ON resistance of low side switch M2 has a positive temperature coefficient, control circuit 100 performs an internal crest factor measurement to detect excessive or dangerous currents or inductor saturation, which can occur during a lamp non-ignition fault condition. Control circuit 100 performs a crest factor measurement to provide a relative current measurement that is independent of temperature and/or tolerance variations of the RDSON internal ON resistance of the low side half bridge switch M2. The crest factor of a current waveform is typically defined as the ratio of the peak current in amps to the RMS current in amps. For example, the crest factor for a typical sinusoidal 60 Hz current waveform is 1.4. The crest factor measurement therefore obtains an indication of current spikes in the output stage that can be excessive or dangerous if experienced for a certain amount of time. In a preferred embodiment of the present invention, a crest factor of 4, i.e., the peak current is four times the average current, is used to determine fault conditions.

If a peak current exceeds the average current by a factor of 4 for approximately fifty switching cycles as determined on line LO, control circuit 100 determines a fault has occurred. At that point, during the ON time of an output pulse on line LO, control circuit 100 enters fault mode and both gate drivers for lines HO and LO driver outputs are latched low. This safety condition persists until power is cycled to control circuit 100. Preferably, supply voltage VCC is recycled below and above the internal UVLO thresholds. The crest factor can be arbitrarily set to any given number depending on the application. In addition, the number of switching cycles for detecting a crest factor fault can be set to an arbitrary number depending on the application. One advantage to determining a fault after a number of switching cycles is observed in the case of inductor saturation. During lamp ignition, the inductor can saturate for several cycles while the lamp arc is being established. The saturated inductor appears as a shutdown fault condition. However, control circuit 100 waits for the given number of switching cycles before determining a fault has occurred to avoid false fault detection in this situation.

A further embodiment of the crest factor detection is that it is only enabled during the on-time of LO, after a small delay (1 us) after the rising edge of LO. Crest factor detection is disabled during the deadtime and during the on-time of HO. This is because the inductor current saturates towards the end of the LO on-time. Crest factor detection is used for inductor current saturation detection. Other fault conditions like open filament are detected by non-ZVS shifting and 1V VCO shutdown threshold. As the frequency is sweeping towards resonance for ignition during crest factor detection, the circuit obtains the maximum voltage that the inductor can deliver before it saturates. Since inductor saturation is highly dependent on temperature, the crest factor will then cause the maximum voltage delivered by the circuit to adjust automatically for tolerances based on temperature. At low temperatures, for example, the lamp requires higher ignition voltages to ignite. Since inductors can withstand higher currents before saturation at lower temperatures, the circuit produces a higher voltage before the crest factor detects saturation and shutdown. This adaptive feature thus provides higher voltages at lower temperatures when necessary. Also, if the inductor saturation level is low or a highly varying core material is used such that the saturation level is inconsistent during production, the circuit will still shutdown at saturation and therefore protect the circuit against damaging currents that can occur during saturation.

Another fault detected by control circuit 100 is an open filament lamp fault. Open filament lamp faults can cause hard switching at the half bridge and potentially damage switches M1 and M2. This type of fault is detected through the non-zero volt switching circuit or the crest factor circuit after approximately fifty switching cycles in the presence of the fault condition. The adaptive control enters a fault mode when this fault is determined, and the high and low gate driver outputs are latched low. As with the non-ignition fault, power must be cycled to control circuit 100 to remove the fault condition. Preferably, voltage supplied to VCC is cycled to be below and above the internal UVLO thresholds, resetting control circuit 100 back to a preheat mode.

Control circuit 100 also provides protection for brown out or under voltage conditions. During a mains brown-out fault condition, the DC bus voltage can decrease causing the amplitude of the voltage available to the lamp resonant output stage to decrease and lamp 33 can extinguish. In this situation, control circuit 100 adjusts the switching frequency such that ZVS is maintained. The result is that the frequency increases as the DC bus voltage decreases. The increasing frequency and decreasing voltage causes the lamp power to decrease and lamp 33 to dim, but not extinguish. If lamp 33 extinguishes when the DC bus decreases further, the frequency is shifted high enough and the VCO voltage decreases low enough such that the preheat/ignition sweep is reset. When the AC line voltage increases again, the frequency will decrease again towards resonance and lamp 33 re-ignites. Control circuit 100 thus protects against open filament, lamp removal, component tolerances, mains brown-out, and end-of-life of the lamp (where the lamp voltage increases as the lamp ages and the circuit continuously adapts such that ZVS is maintained and no damage occurs to the circuit).

Figure 6:
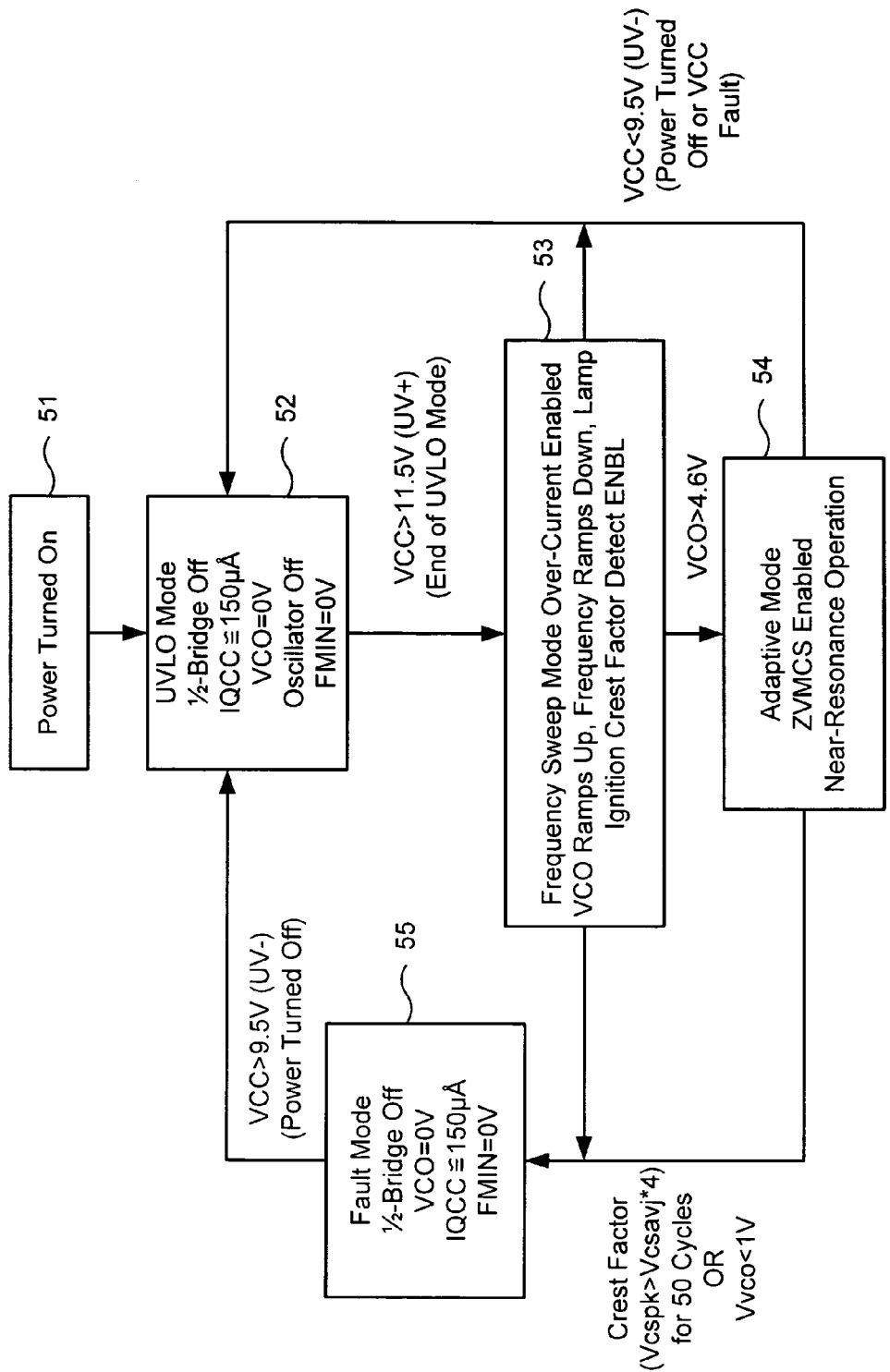
FIG. 6 is a state flow diagram illustrating an operational flow of the hybrid ballast control according to the present invention.

Referring now to FIG. 6, a flowchart describing operation of control circuit 100 is illustrated. After power is turned on in block 51, DC power is supplied to both rails of the DC bus. Control circuit 100 enters UVLO mode in block 52, during which the half bridge is maintained in an OFF condition while current supplied to the electronic ballast is approximately 150 μa. At this point the voltage on line VCO is zero volts and VCO 21 is off. Similarly, the voltage on line FMIN of control circuit 100 is zero volts. The state in block 52 is exited once the voltage on line VCC is greater than 11.5 volts, which is the upper threshold level for UVLO mode. Once the state in block 52 is exited, UVLO mode ends.

At the end of UVLO mode, frequency sweep mode is entered in block 53, during which overcurrent protection is enabled and the voltage on line VCO begins to increase exponentially. In a preferred embodiment, the voltage on line VCO can increase linearly. During this state, the frequency output of VCO 21 begins to ramp down as the VCO input ramps up, leading to oscillation in the half bridge to supply current and voltage to the load to cause lamp ignition. It is during this state that preheating occurs, and maximum current is supplied to the load to permit preheating and ignition. If a fault occurs during this state, such as a lamp ignition failure, control circuit 100 enters a fault mode state in block 55 to protect the electronic ballast circuit. In addition, if an undervoltage condition occurs i.e., VCC is less than 9.5 volts, the UVLO low threshold, the state of control circuit 100 is returned to UVLO mode in block 52.

Conventional ballasts circuits remain at a fixed preheat frequency for the duration of a preheat time, and then ramp the switching frequency up quickly for ignition. The preheat method achieved by control circuit 100 preheats the filaments and ignites the lamp together in a single frequency sweep. The parameters of this method are simple to program by adjusting the value of capacitor CVCO for adequate preheating. This novel method substantially reduces the number of connections and external components used to program the preheat functions. Conventional ballast control ICs require a first separate pin for setting the preheat time, a second separate pin for programming a higher start frequency to prevent a flash on the lamp at initial start-up of the half-bridge, a third separate pin for programming the preheat frequency, and a fourth separate pin for programming the ignition ramp time. The method according to the present invention uses a single connection and a single passive component which greatly simplifies the circuit, the functionality, the system cost, the manufacturability and reduces size of control circuit 100, the number of connections, packaging requirements and final testing.

Otherwise, if lamp 33 ignites normally, control circuit 100 enters an adaptive mode state in block 54, with the voltage on line VCO greater than approximately 4.6 volts. This state permits zero volt switching and minimum current switching to be enabled at near resonance operation. In the adaptive mode state in block 54, the closed loop feedback control is operative to adjust switching frequency based on the sensed voltage on line VS. Normal adaptive run mode continues indefinitely, or until either a fault is sensed or an undervoltage condition occurs. If an undervoltage occurs, i.e., VCC is less than 9.5 volts, control circuit 100 enters UVLO mode in block 52, shutting off the half bridge drivers and disabling VCO 21. In this way, if power is turned off, the half bridge and the entire electronic ballast is shut down in a controlled mode to avoid additional component wear.

If control circuit 100 is operating in adaptive mode in block 54 and a fault occurs, a fault mode state in block 55 is entered, in which the half bridge drivers are disabled and VCO 21 is shut off. This state is similar to UVLO mode, with the exception that the state in block 55 is reached upon a crest factor fault determination or non-zero volt switching for approximately fifty switching cycles of low side driver output LO. The state transition conditions from block 54 to 55 call for a peak voltage, representative of a peak current, to be greater than four times an average voltage, representative of an average current value. This determination provides a crest factor of 4 for overcurrent or inductor saturation condition detection. In addition, control circuit 100 detects non-zero volt switching to determine whether a fault has occurred, typically resulting in hard switching at the half bridge. In each of the above fault condition cases, if the fault is detected for fifty switching cycles of low side driver output LO, a fault condition is established and control circuit 100 enters a fault mode state in block 55. The fault mode state in block 55 is maintained until power is cycled to control circuit 100, i.e., VCC is lowered to below the lower UVLO threshold of 9.5 volts, at which point control circuit 100 transitions to UVLO mode state in block 52.

Control circuit 100 detects an open load, or open filament, fault condition by detecting changes in operational conditions. During an open fault condition, control circuit 100 detects a non-ZVS condition and attempts to increase the frequency to return operation of the ballast to ZVS. In the presence of a fault condition where the load is removed or where the filament is open, the voltage on line VCO is decreased to further increase the frequency output of VCO 21. When the voltage on line VCO reaches approximately 1 volt, the maximum frequency for VCO 21 is reached. When the voltage on line VCO decreases below 1 volt, a fault condition is deemed to have occurred and control circuit 100 latches the high and low side switch control outputs HO and LO into an OFF condition. This fault condition for line VCO with a 1 volt latch off threshold is not activated until the voltage on line VCO first increases from zero volts to above 4.6 volts, i.e., after preheat and ignition. Delaying the enable of the fault condition threshold permits control circuit 100 to start up without immediately latching off the high and low side outputs HO and LO OFF due to what would otherwise be determined to be a fault condition.

An open filament fault condition is handled by control circuit 100 after a normal start sequence. Control circuit 100 turns on and the voltage on line VCO ramps up normally from zero volts to 4.6 volts for normal preheat and ignition. Once the voltage on line VCO exceeds 4.6 volts and the control enters the adaptive run mode, non-ZVS protection is activated, as is the fault condition threshold of 1 volt on line VCO for latching off the half bridge outputs HO and LO. At this point, the frequency output of VCO 21 continues to increase in an attempt to maintain ZVS in the open filament condition, until the voltage on line VCO decreases below 1 volt, and control circuit 100 safely latches off the outputs for controlling the half bridge. The time to shut down the outputs during an open filament fault condition as described above, is approximately the preheat time plus the time to discharge the voltage on line VCO to below 1 volt. The total time for these events is typically less than approximately 10 milliseconds. The events within the time frame described above provide a total shut down time that is short enough to prevent damage to the half bridge switches and the ballast circuitry.

Another feature of the present invention provided in adaptive run mode in block 54 is a frequency dither to reduce noise generated by the ballast that reduces the EMI filtering on the ballast input. When the input to VCO 21 on line VCO ramps up to 5.1 volts, the voltage on line VCO is discharged linearly by 200 mV to approximately 4.9 volts. When the voltage on line VCO decreases below 4.9 volts, the voltage on line VCO is then charged linearly again to 5.1 volts. This slight charging and discharging of the voltage on line VCO by approximately 200 mV occurs continuously during adaptive run mode in block 54. The charging and discharging causes the frequency to dither slightly by a few kilohertz. Consequently, the operating frequency of the half bridge also slightly dithers such that the resulting EMI disturbance peak at the operating frequency will be lower because the switching frequency becomes spread out by a few kilohertz. The resulting EMI disturbance is then lower, which then results in reduction or the possible removal of external EMI filtering on the ballast input. This component reduction or elimination obtains the advantage of better system operation with reduced cost and lower component count for the overall system.

Figure 7:
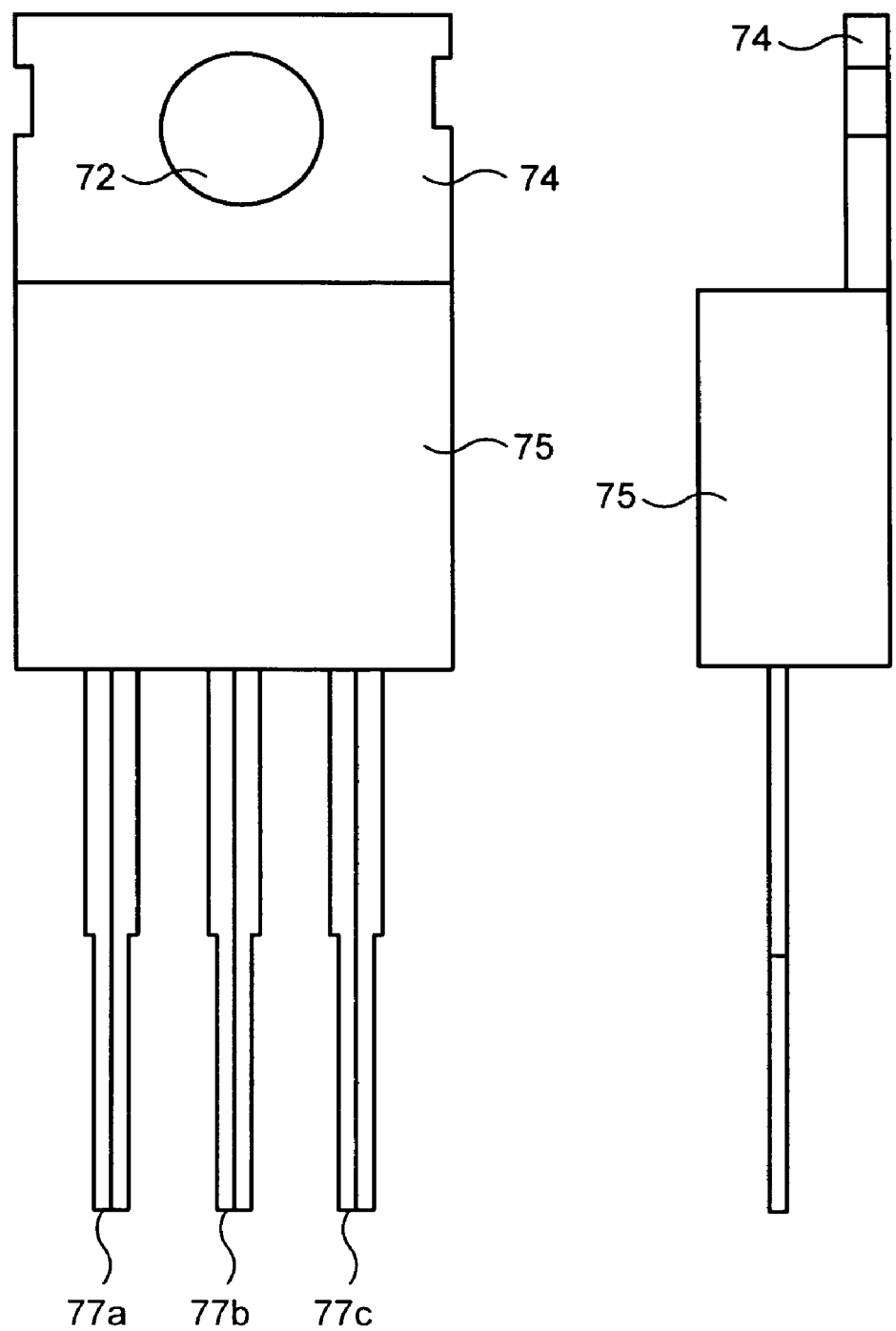
FIG. 7 is a front and side view of a TO220 package with three connection pins.

Referring now to FIG. 7, a TO220 package 70 is illustrated in a front view and side view. Package 70 includes a through hole 72 for use in mounting package 70. In one embodiment of package 70, mounting clip 74 also serves as a heatsink to remove heat from the circuit enclosed in package 70. A package body 75 houses the circuitry of the hybrid electronic ballast circuit in accordance with the present invention. The entire hybrid electronic ballast circuit is enclosed within body 75, including the passive resistor and capacitor components, the control circuit and the power switches that form the switching half-bridge.

As illustrated in FIG. 3, hybrid ballast control 20 can be implemented with only three connections in the lighting circuit. Package 70 includes three connector pins 77A, 77B and 77C, which are all the connections used by hybrid ballast control 20. Because package 70 houses the power switches, pins 77A-77C are of sufficient dimension to carry the high currents that are switched by the power switches. It should be apparent that although a TO220 package is described in the present application, a number of other types of packages may be used to house hybrid ballast control 20 according to the present invention. For commercial purposes, the package should be easily manufactured and easily handled, and have standard dimensions and mounting sections. Through the use of a standard package to house hybrid ballast control 20, a number of high volume applications can be commercially realized. For example, a package housing hybrid ballast control 20 can be supplied to a lighting fixture for manufacture in a simple and cost effective format, and presents the opportunity for automatic assembly because of the standard package configuration. Alternately, a package housing hybrid ballast control 20 can be supplied to a CFL lamp manufacturer, for example, for incorporation into a stand alone lamp module. The simple three connection configuration of hybrid ballast control 20 permits straightforward incorporation into gas discharge lighting circuits to improve manufacturability and reduce production costs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic ballast circuit, comprising:
   an encapsulating package for the entire circuit;
   a first external connection extending out of said encapsulating package for receiving power from a power supply to power the electronic ballast circuit, said first external connection coupled to a high side node of an internal power switching unit of said electronic ballast circuit;
   a second external connection extending out of said encapsulating package for supplying power to a resonant load, said second external connection coupled to a switch node of said internal power switching unit; and
   a third external connection extending out of the package for connection to a common reference to provide a return power path, said third external connection coupled to a low side node of said internal power switching unit;
   wherein said first external connection, said second external connection, and said third external connection comprise all external power connections to the encapsulated circuit.

2. The electronic ballast circuit of claim 1, wherein said encapsulating package is a TO220 package with three electrical connections.

3. The electronic ballast circuit of claim 1, wherein said resonant load comprises a gas discharge lamp in a resonant circuit.

4. The electronic ballast circuit of claim 1, wherein said power switching unit is implemented using a half-bridge configuration.

5. The electronic ballast circuit of claim 4, wherein said high side node couples a high side switch of said half-bridge to said first external connection, said switch node couples said high side switch and a low side switch of said half-bridge, and said low side node couples said low side switch to said third external connection.

6. The electronic ballast circuit of claim 1, further comprising an internal switch control unit configured to drive said internal power switching unit.

7. The electronic ballast circuit of claim 6, wherein said internal switch control unit comprises a voltage control oscillator (VCO) to control a switching frequency of said internal power switching unit.

8. The electronic ballast circuit of claim 7, wherein a frequency of said VCO is controlled differently during a startup mode of said resonant load and during a normal run mode of said resonant load.

9. An electronic ballast circuit, comprising:
an encapsulating package for the entire circuit;
a first external connection extending out of the package for receiving power from a power supply to power the electronic ballast circuit;
a second external connection extending out of the package for supplying power to a resonant load; and
a third external connection extending out of the package for connection to a common reference to provide a return power path;
wherein said first external connection, said second external connection, and said third external connection comprise all external power connections to the encapsulated circuit.

10. The electronic ballast circuit of claim 9, wherein the encapsulating package is a TO220 package with three electrical connections.

11. The electronic ballast circuit of claim 9, wherein said resonant load comprises a gas discharge lamp in a resonant circuit.

12. The electronic ballast circuit of claim 9, further comprising a power switching unit coupled to said first external connection, said second external connection, and said third external connection.

13. The electronic ballast circuit of claim 12, wherein said power switching unit is implemented using a half bridge configuration.

14. The electronic ballast circuit of claim 12, further comprising a switch control unit configured to drive said power switching unit.

15. The electronic ballast circuit of claim 14, wherein said switch control unit comprises a voltage control oscillator (VCO) to control a switching frequency of said power switching unit.

16. The electronic ballast circuit of claim 14, wherein a frequency of said VCO is controlled differently during a startup mode of said resonant load and during a normal run mode of said resonant load.

* * * * *

UNITED STATES PATENT AND TRADEMARK OFFICE
CERTIFICATE OF CORRECTION

| | | |
|---|---|---|
| PATENT NO. | : 7,656,096 B2 | Page 1 of 1 |
| APPLICATION NO. | : 10/835637 | |
| DATED | : February 2, 2010 | |
| INVENTOR(S) | : Thomas J. Ribarich | |

It is certified that error appears in the above-identified patent and that said Letters Patent is hereby corrected as shown below:

In the claims, column 14, line 6, "half bridge" should be changed to --half-bridge--.

Signed and Sealed this
Twenty-second Day of November, 2011

David J. Kappos
*Director of the United States Patent and Trademark Office*